(No Model.) 3 Sheets—Sheet 1.
M. S. McCOY.
BAND CUTTER AND FEEDER.
No. 583,073. Patented May 25, 1897.
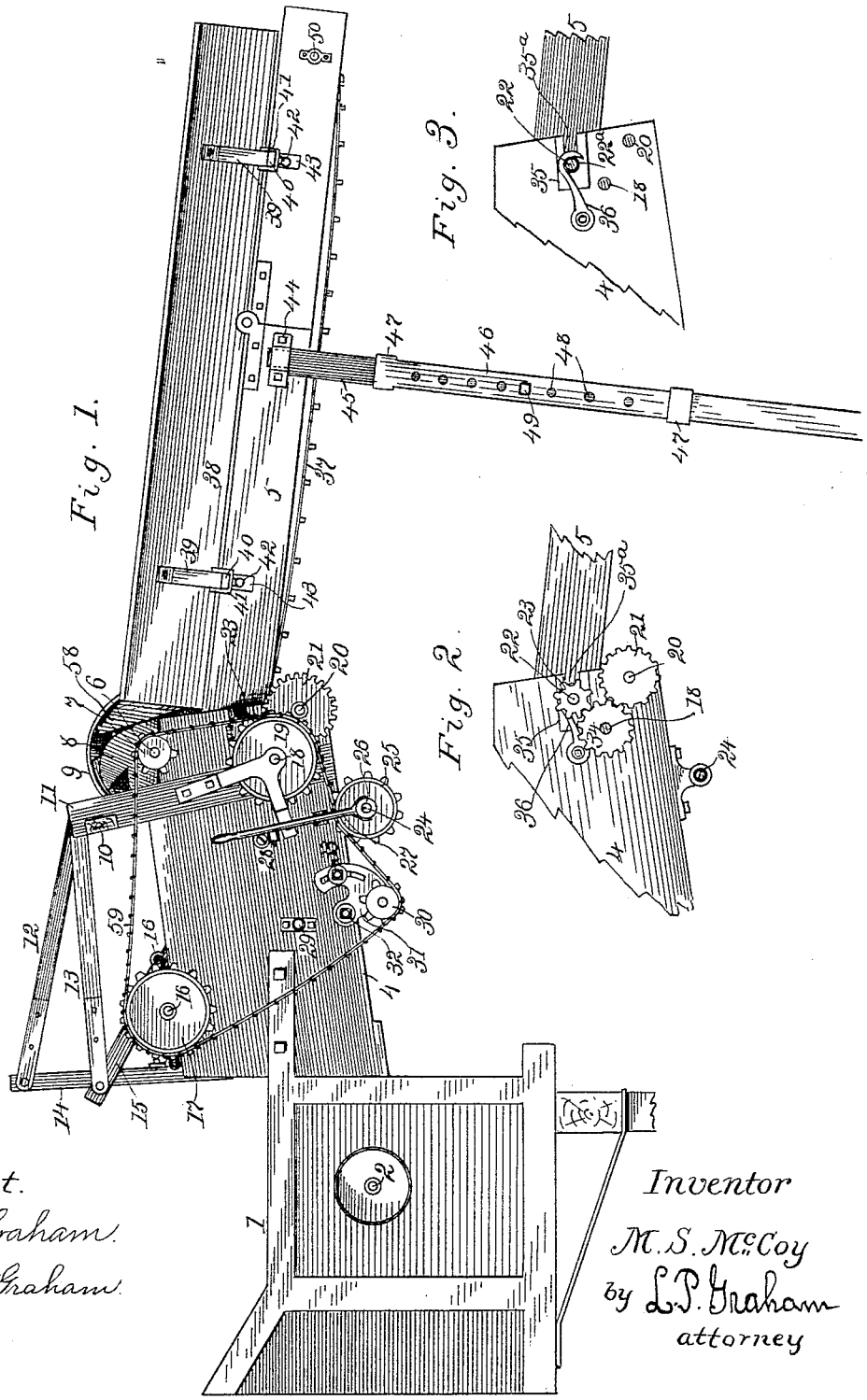
Attest.
Ina Graham
Nora Graham
Inventor
M. S. McCoy
by L. P. Graham
attorney

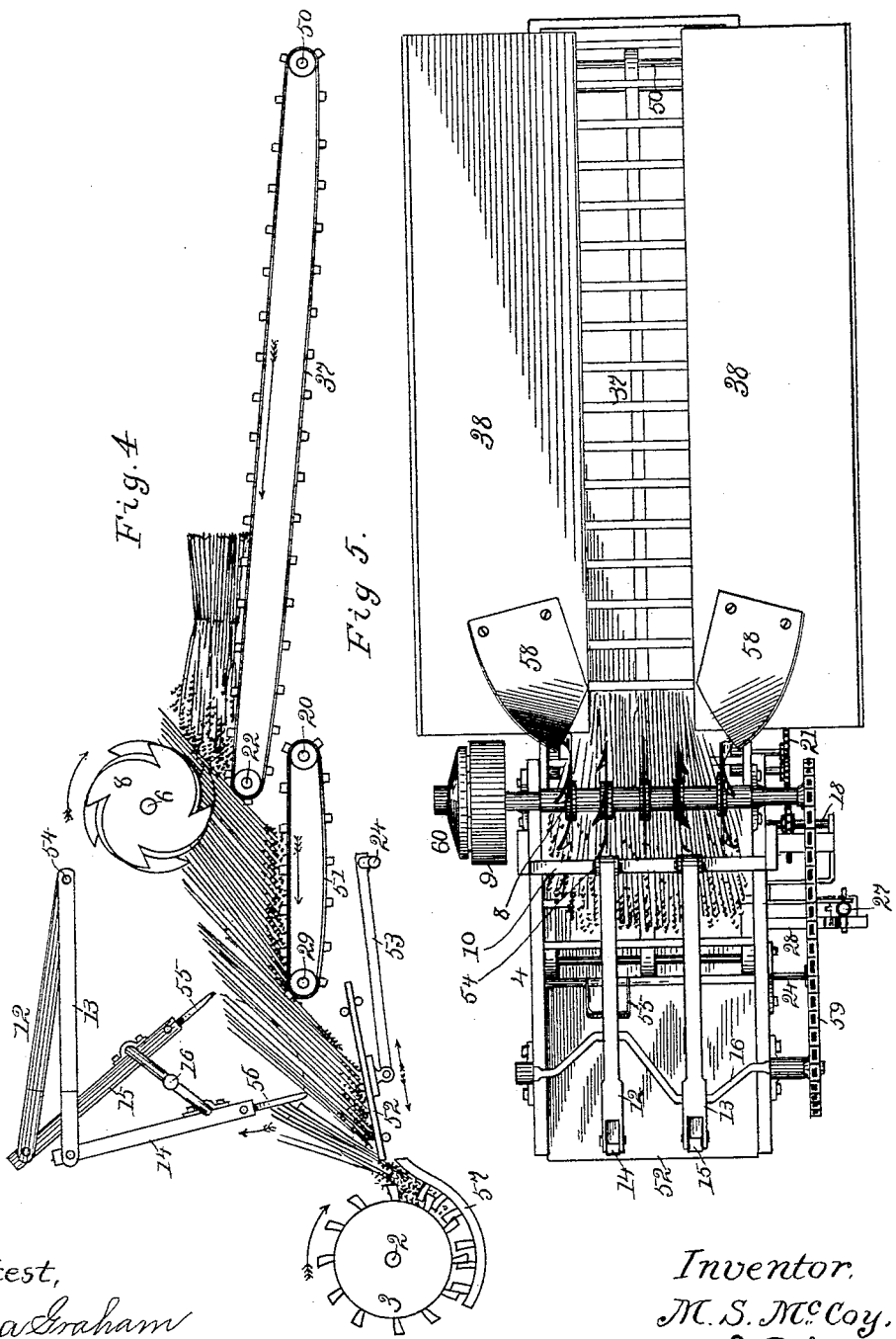

(No Model.) 3 Sheets—Sheet 3.
M. S. McCOY.
BAND CUTTER AND FEEDER.
No. 583,073. Patented May 25, 1897.
*Fig. 6*
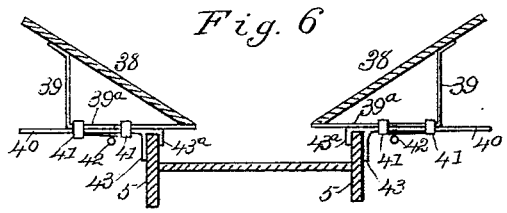
*Fig. 7.* *Fig. 8*
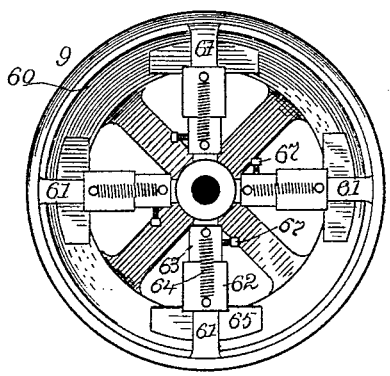 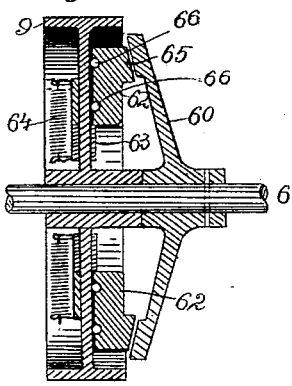
*Fig. 9*
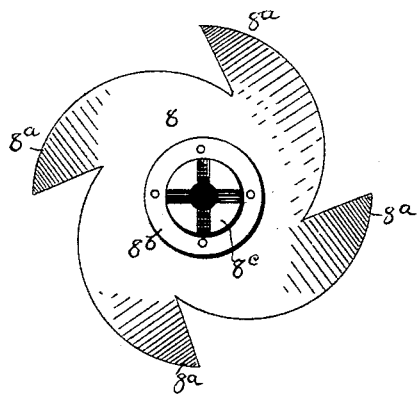
Attest,
Ira Graham
Nora Graham
Inventor
M. S. McCoy
by L. P. Graham
attorney

UNITED STATES PATENT OFFICE.

MELVIN S. McCOY, OF MECHANICSBURG, ILLINOIS, ASSIGNOR OF TWO-FIFTHS TO BARLOW A. McCOY, OF VERSAILLES, ILLINOIS.

BAND-CUTTER AND FEEDER.

SPECIFICATION forming part of Letters Patent No. 583,073, dated May 25, 1897.

Application filed September 28, 1896. Serial No. 607,155. (No model.)

*To all whom it may concern:*

Be it known that I, MELVIN S. McCOY, of Mechanicsburg, in the county of Sangamon and State of Illinois, have invented certain new and useful Improvements in Band-Cutters and Feeders, of which the following is a specification.

This invention is designed to supplant hand labor in cutting bands of bundles of grain and feeding the grain to threshing-machines. It is exemplified in the structure hereinafter described, and it is defined in the appended claims.

In the drawings forming part of this specification, Figure 1 is a side elevation of a band-cutter and feeder embodying my improvements. Figs. 2 and 3 are details illustrative of a provision for separating the trough of the supply-carrier from the frame of the band-cutter and feeder without specially manipulating the driving-gear. Fig. 4 is a diagram showing in side view the operation of feeding the grain to the cylinder of a thresher and cutting the bands of the bundles in transit. Fig. 5 is a plan of the device, illustrating the act of spreading a bundle of grain sidewise. Fig. 6 is a vertical cross-section through the trough of the supply-carrier, showing means for adjusting the inclined side boards of the trough in a manner to make the operative portion of the carrier wider or narrower. Fig. 7 is a face view of a clutch-wheel that is used to limit the action of the band-cutter and feeder to such times as the thresher-cylinder is running at an operative speed. Fig. 8 is a diametrical section through the clutch-wheel. Fig. 9 is a detail of a band-cutter and spreader-disk.

In constructing a band-cutter and feeder in accordance with my invention a frame, consisting in the main of a pair of side boards, as 4, is made as indicated in the drawings, and is when in operation connected with a thresher, as 1, with the lower portion of its rear end approximately in line with shaft 2 of the cylinder of the thresher. Across the upper side of the frame near the front end thereof is extended a shaft 6, which is journaled in boxes fastened to the side boards. A plurality of bladed disks, in this instance 5, are fixed on shaft 6 at approximately regular intervals between the side boards. One of the disks is located at the center of the shaft or midway between the side boards. Its blades extend in the same plane with its body portion, and it is, preferably at least, of greater diameter than the others. The side disks have their blades turned away from the central disk, and the shape of the blades of all the disks is such that as the shaft is rotated in the direction indicated in Fig. 4 a number of eccentric convex cutting-surfaces are successively presented to or struck against the grain as the grain is passed under the shaft. In Fig. 9 a side disk is shown at 8, the blades thereof at 8$^a$, and the side deflection of the terminations of the blades is indicated by shade-lines. The central bore of the disks is lengthened in each instance by means of castings 8$^b$, fastened to the sides of the disks, thereby giving longer bearings on the shaft and consequently greater stability, and clutch extensions 8$^c$ may be formed on the castings and be utilized in fastening the disks together and to the shaft. In this case the cutting edges of the blades of the disks are shown smooth, but they may be serrated more or less deeply, if desired.

To provide for supplying grain to the band-cutter, a trough, as 5, is made to extend forward from the front end of frame 4 and from below the band-cutter, and it is equipped with a carrier belt, drag, or apron, as 37, that is driven in the direction indicated by its adjacent arrow in Fig. 4, and the termination of its rearward run is under the band-cutter disks. Below and to the rear of the rearward run of carrier 37 is a shorter feed-carrier 51, which runs in the same direction as carrier 37, but at a slower rate of speed. A board 52 extends from below the rear end of carrier 51 to, or nearly to, the concave 57 of the threshing-cylinder. A plurality of bars (in this instance two, 12 and 13) are pivotally connected at 54 with a cross-bar 10 of frame 4. They extend rearward from their pivots, and they connect pivotally at their rear ends with the upper ends of handles 14 and 15 of feed-forks 56 and 55. Shaft 16 is doubly cranked, as shown in Fig. 5. It extends across frame 4 near the rear end thereof, and its cranked portions carry the lower ends of the handles of the feed-forks. This construction and arrangement supply a feed-belt to the rear of the supply-belt and lower than the supply-belt a distance somewhat less than the length of straws of grain. The feed-belt travels slower than the supply-belt. The board 52 bridges the space between the feed-belt and the cylinder of the thresher, and the feed-forks describe orbital movements downward and backward past the rear end of the feed-belt and over the carrier-board. As a result of such construction and arrangement each bundle of grain passing to the feed-belt forms an underlap with the bundle next preceding, the grain traverses the feed-belt and the board with the butts of the straw presented upward and backward with relation to the direction of motion, and the feed-forks lift thin layers of grain by engaging the butts of the straw and tilt the grain head foremost into the space between the cylinder and the concave. Bundles of grain are carried head forward, direction of motion considered, on supply-belt 37 and are passed under the band-cutter shaft. The bands are severed usually by the central disk, though all the disks are cutters, and the released straw is spread laterally by the sidewise cam-like action of the side disks. Simultaneously with the band cutting and side spreading the grain pitches downward against the feed-belt, leaving the butt-ends projecting upward above the supply-belt. The bundle next following tends to force the butts upward and onward until such following bundle also pitches downward to the feed-belt, and so the bundles are continually underlapping obliquely, the advance one being always slightly above the one next following. With this peculiar underlap established the grain passes along the feed-belt and pitches off the belt onto board 52, where it assumes a position slightly more nearly vertical. The underlapping tendency of the grain is maintained in passing from the feed-belt to the board. The grain approaches the cylinder with its butts extended upward in the path of the feed-forks, and as a final step for which all others are preparatory each fork at each revolution takes a thin layer of grain, engaging it buttwise, and pitches it head forward into the space between the cylinder and the concave in what is practically a continuous, evenly-distributed, and uniform stream.

Ordinarily the board 52 may be stationary, but in cleaning up and in regular threshing, under some conditions of grain, it may be better to give the board an endwise-shaking motion, in order to assure perfect and complete feeding, and this is accomplished by providing for endwise motion in the board and by connecting it by means of a pitman, as 53, with a crank-shaft, as 24. As motion needs be only occasionally given to the board, provision is made, as will appear in subsequent descriptive matter, whereby the crank-shaft 24 may be put into or out of motion at will.

The band-cutter shaft has a sprocket-wheel 7, the crank-shaft 16 has a sprocket-wheel 17, and the crank-shaft 24 has a sprocket-wheel 25. A sprocket-wheel 19 is mounted on shaft 18, an idler sprocket-wheel 30 is carried on swinging-frame 31, and all such wheels are in the same vertical plane. A chain 59 runs in contact with all the sprocket-wheels, its outer surface being in contact with wheel 25 and its inner surface in contact with all the others, and it receives motion from the band-cutter shaft and imparts it to the wheels of the other shafts. Wheel 25 runs loosely on its shaft, and clutch member 26 is splined on the shaft and adapted to engage the wheel. A lever 27 engages the clutch member 26, and a lock-bar 28 provides for holding the lever with the clutch in or out of engagement with the wheel. As hereinbefore explained, the shaft 24 usually stands idle, but when it is desirable to shake board 52 the clutch 26 is thrown into engagement with wheel 25.

As shown in Fig. 2, a gear-wheel 34 is fastened onto shaft 18, and it meshes with wheel 21 on shaft 20 and with wheel 23 on shaft 22. Shaft 20 carries the drive-rollers of the feed-belt 51, and the idler-rollers of such belt are carried on shaft 29. The drive-rollers of the supply-belt are carried on shaft 22, and shaft 50 carries the idler-rollers of such belt. Shaft 22 is journaled in the sides of trough 5. It has sleeves, as $22^a$ in Fig. 3, encompassing its projecting ends. Such projecting ends lie, when the device is in operation, in slots $35^a$ in the sides of the frame of the band-cutter and feeder, and detents, as 36, hold the shaft in the slot. The slotted portions of the band-cutter and feeder-frame are strengthened by the slotted plates 35. By means of this provision the trough of the supply-belt may be detached from the band-cutter and feeder, either partly, for purposes of folding, or entirely, for purposes of separate storage, and when it is replaced the teeth of wheel 23 will readily mesh with the teeth of wheel 34, and the driving connection will be established by simply slipping the shaft of the trough into the slots of the frame and catching them there by the detents or their equivalents.

The idler-wheel 30 performs the function of a belt-tightener and also directs the chain in such manner as to compel its operative connection with wheel 25. Its frame 31 is pivotally connected with side 4 at 32, and it has a concentric slot through which securing-bolt 33 extends and by means of which it is adjusted up or down to bring the chain to proper tension.

As the height of the stack or other accumulation from which the bundles are obtained varies, so is it desirable to raise or lower the receiving end of the trough of the supply-belt. Such adjustment is made possible in this instance by pivoting the trough on the shaft of its power-receiving wheel, and it is effected by making the supports of its outer end in vertically-slidable sections. The upper sections of the supports, as 45, are held in sockets, as 44, which are fastened to the trough. The lower sections 46 have bands, as 47, that embrace the upper sections. A set of holes 48 are made in one or both members of each support, and a bolt or pin 49 provides for holding the supports more or less extended. Under different conditions of grain a greater or less quantity may be handled in a given time by the threshing-machine, the more favorable the condition the more rapid the operation, and to provide for restricting the supply to the capacity of the machine the side boards 38 of trough 5 are made adjustable over the belt, so as to expose a greater or less portion of the entire surface of the belt and so increase or diminish its carrying capacity. The means preferably employed for this purpose consist of bars having the vertical portions 39 and the horizontal portions $39^a$, suitably secured to the under sides of the side boards with the horizontal portions in line with the lower edges of the boards, other horizontal bars, as 40, having downward extensions 43 and $43^a$, adapted to embrace the vertical sides of the trough, bands 41, holding the bars $39^a$ in slidable conjunction with bars 40, and pins, set-screws, or the like adapted to hold the bars in any predetermined relation one to the other.

The cylinder of the threshing-machine cannot do good work unless it is run at a rather high rate of speed, and as it takes some little time to develop the requisite degree of speed and the machinery cannot come at once to rest in stopping it is desirable that the band-cutting and feeding mechanism shall run only at such times as the cylinder is going at an operative rate of speed. To provide for this, the drive-wheel 9 of the band-cutter and feeder shaft is journaled loosely. A friction-wheel 60 is fixed on the shaft with its dished face presented toward the drive-wheel. The arms of the drive-wheel are radially disposed, as shown at 61 in Fig. 7, and are prismatic in cross-section. Slides 62 are mounted on the arms or spokes of the wheel and are provided each with a friction-shoe 65, that is adapted, under certain conditions, to engage the dished friction-surface of wheel 60. The slides have antifriction-rollers, as 66, that enable them to run freely on the spokes, and they are held against centrifugal motion by springs 64. The springs are preferably connected at their inner ends with sleeves 63, that are adjustable on the spokes by means of set-screws 67, and by shifting such sleeves nearer to or farther from the center of the wheel the tensions of the springs are regulated to properly offset centrifugal action.

When wheel 9 first starts, by motion received directly or indirectly from the cylinder-shaft of the thresher, the shoes 65 are out of contact with the friction-wheel, and wheel 9 turns loosely on its shaft. As the speed increases centrifugal force tends with greater and greater stress to overcome the resistance of the springs, and, finally, when the cylinder is running at the required speed the shoes move into contact with the friction-wheel and turn the shaft of the band-cutter and feeder. As soon as the speed of rotation falls below the proper rate the springs will overcome centrifugal force, draw the shoes from contact with the friction-wheel, and stop the band-cutter and feeder.

What I claim, and desire to secure by Letters Patent, is—

1. The combination, in a band-cutter and feeder for threshing-machines, of a carrier-belt for supplying grain to a band-cutter, a band-cutter above the discharge end of the supply-carrier, a feed-carrier extending toward the cylinder from below the discharge end of the supply-carrier, a board extending toward the cylinder from below the discharge end of the feed-carrier, and feed-forks having revolving, or orbital, motion downward and backward past the discharge end of the feed-carrier and above the board, substantially as set forth.

2. The combination, in a band-cutter and feeder for threshing-machines, of a carrier-belt for supplying grain to a band-cutter, a transverse shaft above the discharge end of the supply-carrier, such shaft having band-cutters and sidewise spreaders, a feed-carrier extending toward the cylinder from below the discharge end of the supply-carrier, a board extending toward the cylinder from below the discharge end of the feed-carrier, and feed-forks, having downward and backward revolving, or orbital, motion past the discharge end of the feed-carrier and above the board, substantially as set forth.

3. The combination, in a band-cutter and feeder for threshing-machines, of a carrier-belt for supplying grain to a band-cutter, a transverse shaft above the discharge end of the supply-carrier, such shaft having band-cutters, a drive-pulley loosely mounted on the transverse shaft, a speed-controlled clutch carried by the pulley and adapted to rotate the shaft, a feed-carrier extending toward the cylinder from below the discharge end of the supply-carrier, a board extending toward the cylinder from below the discharge end of the feed-carrier, and feed-forks having downward and backward revolving, or orbital, motion past the discharge end of the feed-carrier and above the board, substantially as set forth.

4. Driving mechanism for band-cutters and feeders, consisting in the combination of sprocket-wheel 7 on the band-cutter shaft, sprocket-wheel 17 on the feed-fork shaft, sprocket-wheel 19 on shaft 18, sprocket-wheel 25 on crank-shaft 24, idler sprocket-wheel 30, chain 59 engaging the several sprocket-wheels, gear-wheel 34 on shaft 18, gear-wheel 21 for the feed-belt, and gear-wheel 23 for the supply-belt and wheels 21 and 23 meshing normally with wheel 34, substantially as set forth.

In testimony whereof I sign my name in the presence of two subscribing witnesses.

MELVIN S. McCOY.

Attest:
E. S. McDONALD,
L. P. GRAHAM.